May 10, 1938. E. T. BRACE 2,116,924
ICE CREAM FREEZER
Filed Feb. 27, 1936 3 Sheets-Sheet 1

Inventor
By EDWIN T. BRACE,
Toulmin & Toulmin
Attorneys

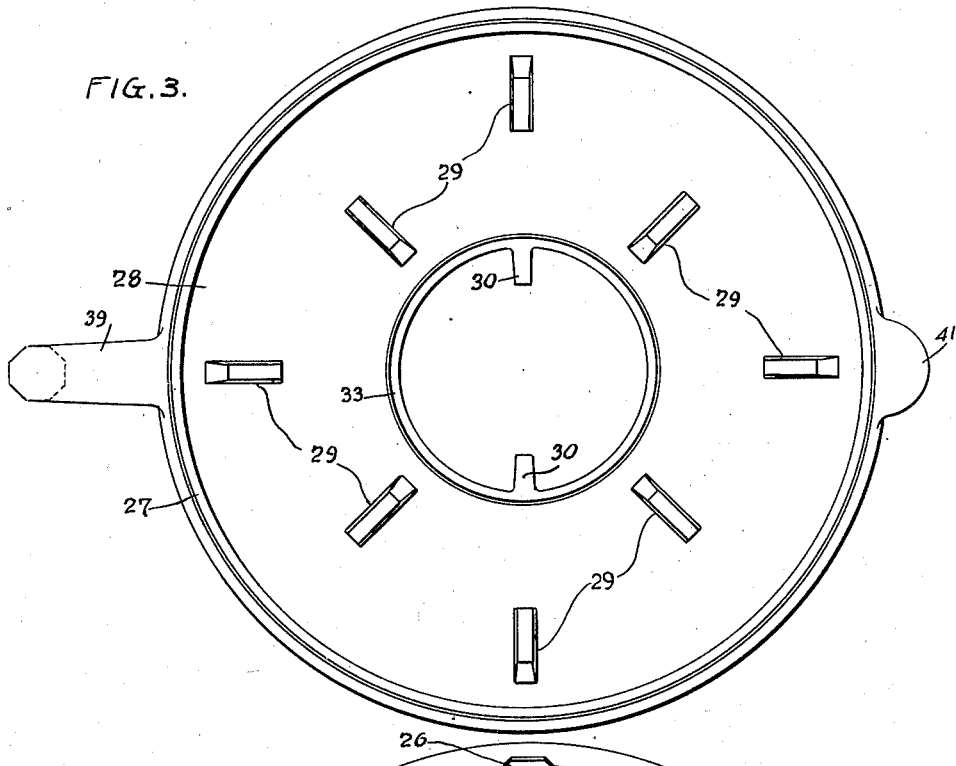
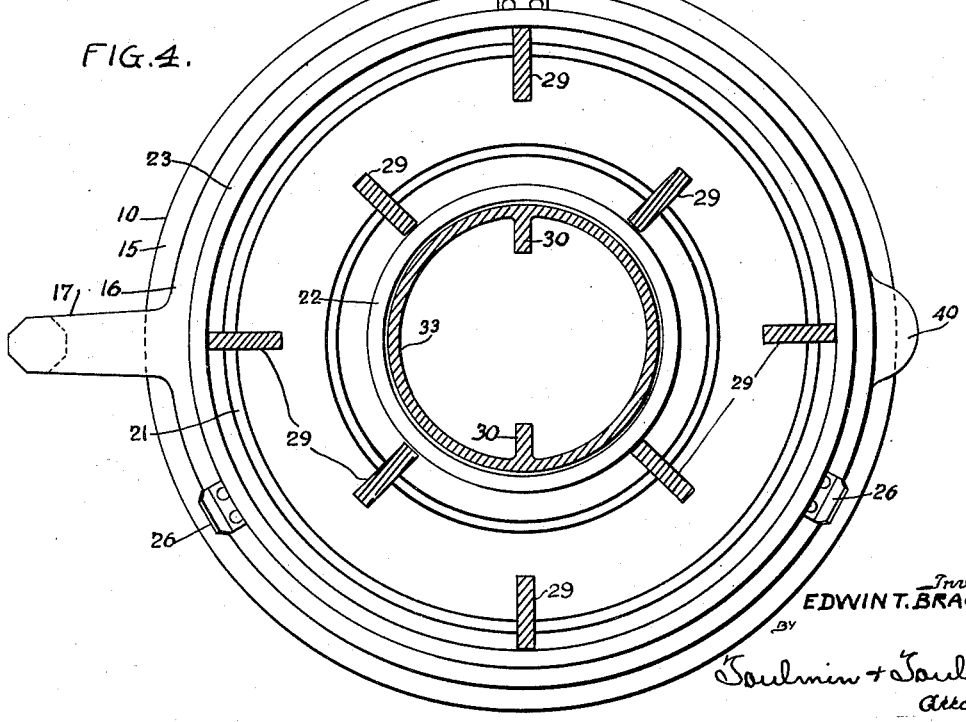

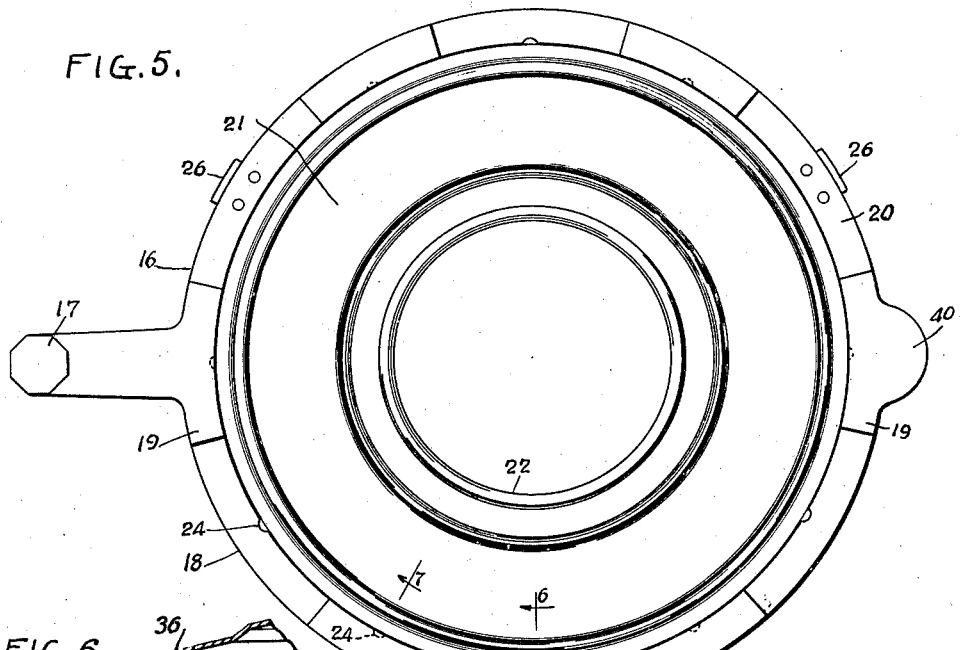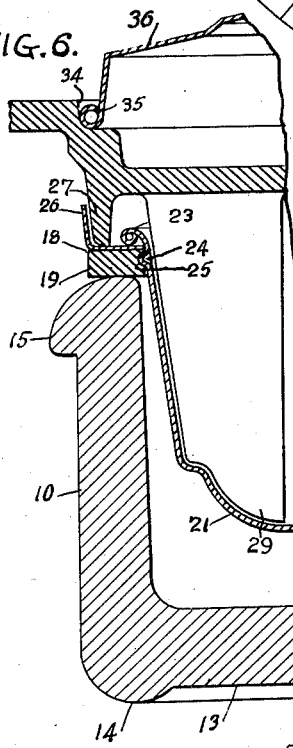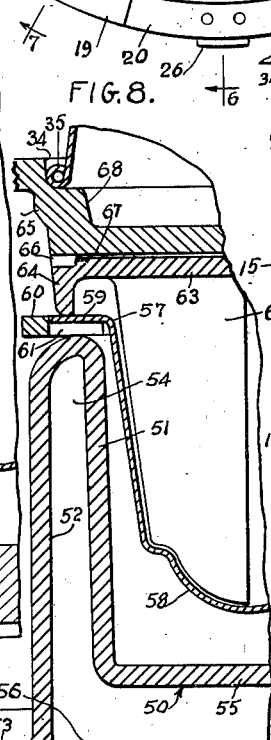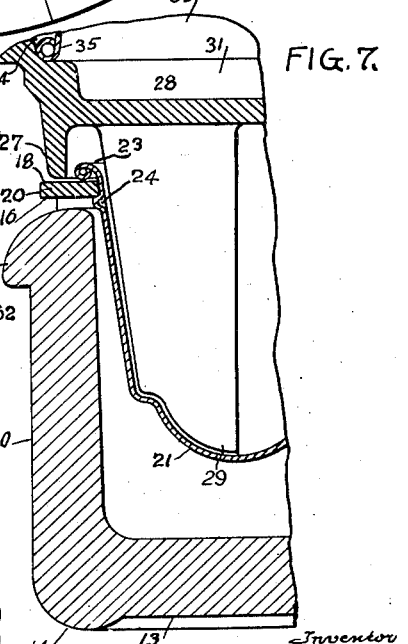

Patented May 10, 1938

2,116,924

UNITED STATES PATENT OFFICE 2,116,924

ICE CREAM FREEZER

Edwin T. Brace, Springfield, Ohio

Application February 27, 1936, Serial No. 66,085

8 Claims. (Cl. 257—105)

This invention relates to ice cream freezers, and in particular, to such devices for household use.

One object of this invention is to provide an ice cream freezer having a manually oscillated member with stirring devices thereon for both the cream and the ice, this member being arranged thereby to conduct the heat from the cream to the ice.

Another object is to provide an ice cream freezer in which the ice is arranged below, at the center of and above the cream container.

Another object is to provide an ice cream freezer having an oscillating cover with a flange adapted to overlap the top of the cream container so as to prevent the ice water from entering the cream container.

Another object is to provide such a cover with apertures, whereby the ice water in the cover can drain into the ice container below the cream container, this cover being preferably provided with a flange to prevent ice water from entering the cream container during such drainage.

Another object is to provide an ice cream freezer with a cover member and a cream container slidably arranged relatively to one another, and bearing members arranged between the cover member and cream container to reduce friction during the relative motion thereof, the cover and the cream container being optionally provided with handles whereby the container may be held from turning while the cover member and the stirring devices associated therewith are oscillated.

Another object is to provide an ice cream freezer with the cream container in annular form so as to permit the production of ice cream in the form of a ring, whereby the ice or freezing solution may be placed above, below and in the center of the cream.

Another object is to provide an ice cream freezer having a heat-resisting ice container in which the cream container is placed, the cream container being shallow and arranged to permit the application of a stirrer, which also serves as a cover, this stirrer being optionally provided with space for additional freezing solution.

Another object is to provide a method of freezing foodstuffs, such as ice cream, by placing the foodstuffs in an annular arrangement and applying a freezing agent to substantially surround said annular arrangement and withdraw heat from all sides, preferably while agitating the foodstuffs and/or the freezing agent.

In the drawings:

Figure 3 is a bottom plan view of the cover with its stirring blades, looking in the direction of the line 3—3 of Figure 2.

Figure 4 is a horizontal section along the line 4—4 of Figure 2.

Figure 5 is a bottom plan view of the cream container and its holder, looking in the direction of the line 5—5 of Figure 2.

Figure 6 is a vertical section along the line 6—6 of Figure 5, showing the bearing means arranged between the cover plate and the cream container holder.

Figure 7 is a section similar to Figure 6, but taken along the line 7—7 of Figure 5, and showing the means for removably securing the cream container within its holder.

Figure 8 is a view similar to Figure 7, but showing a modified construction with a freezing mixture container having an air space, a one-piece cream container, and stirring blades arranged on a holder which is separate from the cover plate.

In general, the ice cream freezer of this invention consists of a freezing solution container, in which is placed an annular cream container, on which is superimposed a cover plate having stirring blades. The cover plate itself is provided with an annular depression, which serves as an additional container for a freezing solution, and the whole is surmounted by a lid. The cover plate is provided with a handle by which it may be oscillated to and fro, and is also optionally provided with additional blades which project downwardly into the freezing solution so that the oscillation of the cover plate to and fro simultaneously stirs the cream and the freezing solution and conducts heat from one to the other.

Figure 1:
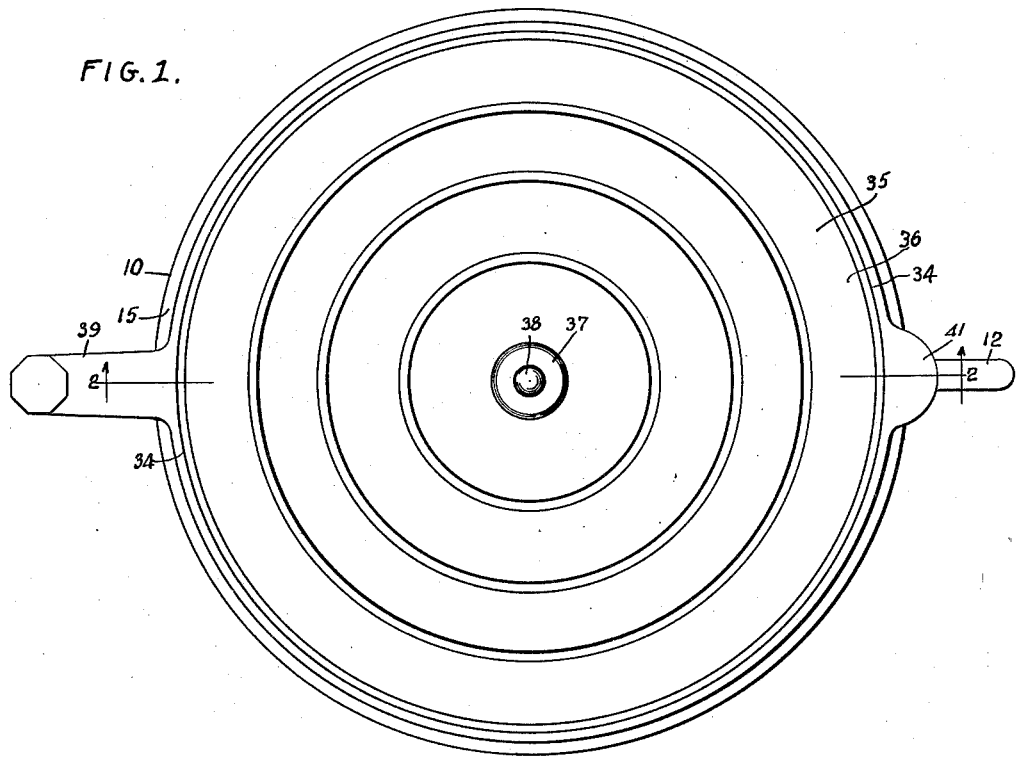
Figure 1 is a top plan view of the ice cream freezer of this invention in completely assembled form.
Figure 2:
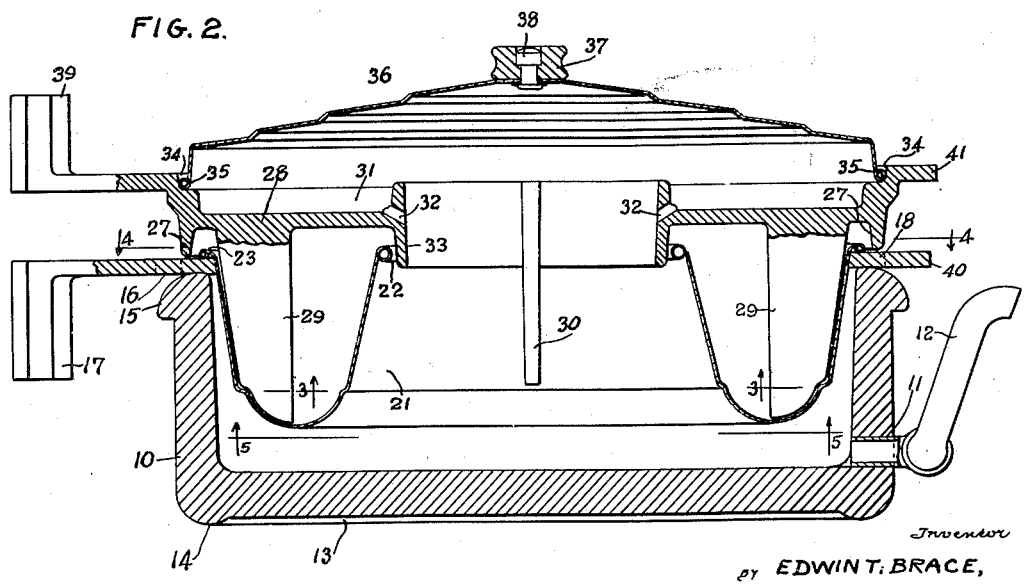
Figure 2 is a central vertical section along the line 2—2 of Figure 1.

Referring to the drawings in detail, Figure 2 shows the ice cream freezer as including an ice container 10 of hollow cylindrical form, and having an aperture 11 in one side thereof adapted to receive an overflow spout 12. The ice container 10 is preferably of material resistant to the conduction of heat, such as wood, or metal with an insulating material or air space therein. The bottom of the ice container 10 is recessed slightly, as at 13, so that the container itself rests upon the lower rim 14, thus formed. Resting upon the upper rim 15 of the ice container 10 is a cream container holder 16 of ring-form, with a handle 17 on one side thereof. The holder 16 is provided with a ring portion 18, having alternating thick portions 19 and thin portions 20 (Figures 6 and 7), thereby giving a crenelated appearance to the ring 18, and permitting free overflow between the ring 18 and the rim 14 of the ice container 10 without danger of the freezing solution entering the ice cream.

Arranged to fit within the ring 18 is a cream container 21, of annular form, and which may be integral with the holder 16 (Figure 8) or separate therefrom. In the latter case it may have an inner rim 22 and an outer rim 23 (Figures 2 and 6), with projecting portions 24, arranged at intervals around the periphery and serving to rest releasably within the recesses 25 in the thick portion 19, or beneath the thin portions 20 of the ring 18 (Figures 6 and 7), as the case may be. Arranged at intervals around the holding ring 18 are L-shaped bearing members 26, which serve as rests to support the downwardly projecting rim 27 of the cover plate, generally designated 28 (Figure 6), and also to center the cover plate 28 as it is lowered into position. The cover plate 28 and the holding ring 18, together with the cream container 21, are preferably of a light heat-conducting metal, such as aluminum, whereas the bearing members 26 are preferably of a dissimilar metal, such as brass, so as to reduce the friction which would otherwise occur between the similar metals constituting the cover plate 28 and the holding ring 18.

The cover plate 28 is provided with outer and inner stirring blades 29 and 30, respectively, these blades projecting downwardly therefrom. The outer blades 29 project downwardly into the cream container 21 so as to stir the contents of the cream container, whereas the inner blades 30 project downwardly within the ice container 10 so as to stir the freezing solution in the latter. The cover plate 28 is provided on its upper side with an annular depression 31 forming an upper ice container, and having apertures 32 opening into the center of the ice container 10. The cover plate 28 is centrally provided with a downwardly projecting flange 33, of annular form and fitting within the inner rim 22 of the ice container 21 so as to prevent the accidental passage of the salt water freezing solution into the cream container 21. Similarly, the outer flange 27 extends downwardly past the outer rim 23 of the cream container 21, and similarly prevents such accidental intrusion of the freezing solution.

The cover plate 28 at its periphery and on its upper side is provided with a recess 34, adapted to receive the rim 35 of a lid 36 having a knob 37 secured to the center thereof, as by the rivet 38. A handle 39 at the edge of the cover plate 28 enables the operator to grasp the cover plate with one hand, while he is grasping the handle 17 of the cream container holder 16 with the other hand. A lip 40 projects from the holding ring 18, on the side opposite the handle 17, and assists the operator in removing the assembly from the ice container 10. A lip 41 is similarly provided on the cover plate 28.

In the operation of the ice cream freezer of this invention, the cream container 21, if separate from the holding ring 18, is snapped into position within the holding ring 18 and the ice cream mixture placed in the cream container 21. The whole is then lowered into the ice container 10, after which the cover plate 28 is superimposed upon the cream container 21, with its blades 29 extending downwardly into the ice cream mixture and its blades 30 extending into the ice container 10. A freezing mixture, such as salt and ice, is then placed in the ice container 10. An additional mixture of salt and ice is also placed in the annular depression 31 in the cover plate 28, and the lid 36 snapped into position within the recess 34.

The operator now grasps the handle 17 with one hand and the handle 39 with the other, and by this means moves the ice cream container 21 and the cover 28 relatively to one another, with an oscillating motion. Preferably the handle 17 is maintained in a stationary position and the cover plate 28, with its stirring blades 29 and 30, moved relatively thereto. The simultaneous stirring of the cream solution and the freezing solution, by means of the blades 29 and 30, and the conduction of heat through the cover plate between these blades, together with the conduction of heat through the walls of the cream container 21, causes the ice cream solution to be quickly frozen. The additional freezing solution in the annular depression 31 increases the speed of freezing. At the same time the motion of the stirring blades 29 gives an even texture to the ice cream, and the motion of the stirring blades 30 evenly distributes the salt and ice throughout the solution. Any excess solution escapes through the drainage spout 12, which may be raised or lowered around its pivot to alter the level of the liquid. The liquid can also overflow over the rim 15 of the ice container 10 because the top of the latter is below the top of the cream container.

After the ice cream has thickened sufficiently during the freezing operation, the operator grasps the handle 39 and the lip 41, and carefully removes the cover assembly 28 from the apparatus. The ice cream container holder 16 is then removed in a similar manner by grasping the handle 17 and the lip 40. The ice cream container 21 with its contents may then be inverted to deposit the ice cream ring, thus formed, upon a platter, or else it may be placed in a refrigerator to await serving at some subsequent time. If desired, the ice cream can be dipped out of the container 21 with a spoon. It will be seen that the blades 29 are disposed at different distances from the center of the circular cover 28 so that these blades, in effect, overlap one another during the stirring motion, and thus equally stir the contents.

Thus it will be seen that I have provided an ice cream freezer in which a shallow annular cream container is almost entirely surrounded by a freezing solution so that freezing is quickly accomplished. The stirring takes place simultaneously in both the freezing solution and in the ice cream solution, and heat is conducted from one to the other rapidly and effectively. At the same time, however, there are no relatively moving parts other than the simple cover plate, and the device is entirely free from gears, shafts and other elements which in prior devices have deteriorated rapidly under the destructive influence of the salt and water mixture. The freezer is small and compact, and can be used upon a table, counter or sink. The construction is simple and well adapted to mass production by means of pressing and casting machinery, so that the user is provided with an efficient freezer at a very modest price.

It will be obvious that while the operation of the device has been described in connection with the use of a freezing solution consisting of a mixture of salt and water, that other freezing agents may be optionally used without departing from the scope or spirit of this invention. For example, solidified carbon dioxide may be optionally used, or a mixture of ammonium chloride, ice and water, as well as other mixtures known to those skilled in the art.

It will be further understood that the term "cream container" is used merely for convenience, and that other solutions adapted for the making of sherbets or ices of various sorts may also be used without departing from the scope or spirit of this invention.

In the modified construction shown in Figure 8 the container 50 for the freezing mixture is formed with an inner container portion 51 and an outer downwardly extending flange 52, terminating at the bottom thereof in an outwardly directed flange 53. In this manner the container 50 is provided with an air space 54 between the inner container 51 and the outer flange 52. At the same time the bottom 55 of the inner container 51 is arranged above the level of the bottom flange 53 so that an air space 56 likewise occurs between the bottom 55 of the inner container 51 and the table or counter upon which the freezer is placed. The container 50 in the form shown in Figure 8 is preferably made of metal.

In the form shown in Figure 8 the cream container 57 is made with an inner portion 58 integral with an outer rim 59, having a handle 60 secured thereto or integral therewith. As in the principal form previously described, the rim 59 is crenelated, as at 61, so as to give free overflow spaces therethrough. In the form shown in Figure 8 the stirring blades 62 are mounted upon or integral with a support 63, provided with a portion 64 which rests upon the outer rim 59. The support 63 is provided with means drivingly interconnecting it with the cover plate 65. The driving means shown consists of lugs 66 on the cover plate 65, adapted to enter correspondingly shaped recesses 67 in the support 63. The cover plate 65 is provided with an annular depression 68, as in the principal form, for receiving an additional freezing solution. The operation of the form shown in Figure 8 is similar to that in the principal form shown in Figures 1 to 7, inclusive, and requires no additional description. In this form the air spaces 54 and 56 give the effect of an insulating layer to prevent the passage of heat into the freezing solution from the outside air. At the same time, the cover plate 65 may be removed independently from the stirring blades 62 and their support 63. It will be understood that one or more of the modified features shown in Figure 8 may be used in the principal form shown in Figures 1 to 7, inclusive.

It will be understood that I desire to comprehend within my invention such modifications as come within the scope of the claims and the invention.

Having thus fully described my invention, what I claim as new and desire to secure by Letters Patent, is:

1. An ice cream freezer comprising a container for a freezing agent, an annular cream container therein, and a stirring member having an outer set of cream stirring blades extending into said cream container and an inner set of freezing agent stirring blades extending into said freezing agent container, said stirring member having a cover portion adapted to cover said cream container and having a depression therein over said cream container adapted to receive additional freezing agent.

2. An ice cream freezer comprising a container for a freezing agent, an annular cream container therein, a stirring member having an outer set of cream stirring blades extending into said cream container and an inner set of freezing agent stirring blades extending into said freezing agent container, said stirring member having a cover portion adapted to cover said cream container and having a depression therein over said cream container adapted to receive additional freezing agent, and a lid arranged to inclose said depression.

3. An ice cream freezer comprising a container for a freezing agent, an annular cream container therein, and a cover plate superimposed upon said cream container, said cover plate having an inner flange extending downwardly past the inner rim of the cream container and having an annular groove adapted to receive additional freezing agent and drainage means arranged between said groove and said freezing agent container.

4. An ice cream freezer comprising a container for a freezing agent, an annular cream container therein, and an annular cover plate for said annular cream container having outwardly positioned cream stirring blades extending into said cream container and inwardly positioned freezing agent stirring blades extending into said freezing agent container, said stirring member having an annular groove adapted to receive additional freezing agent, said annular groove being positioned above said annular cream container.

5. An ice cream freezer comprising a container for a freezing agent, an annular holder, an annular cream container releasably mounted within said holder, and a stirring member superimposed upon said holder and having stirring blades extending simultaneously into said cream container and into said freezing agent container.

6. An ice cream freezer comprising a container for a freezing agent, a cream container therein, a stirring member having stirring portions extending simultaneously into said cream container and said freezing agent container, said stirring member being adapted to cover said cream container and having a depression therein adapted to receive additional freezing agent, and drainage means for draining the excess liquid from said depression.

7. An ice cream freezer comprising a container for a freezing agent, a cream container therein, a stirring member having stirring portions extending simultaneously into said cream container and said freezing agent container, said stirring member being adapted to cover said cream container and having a depression therein adapted to receive additional freezing agent, and a drainage means comprising a conduit extending from said depression to a point of discharge into said freezing agent container.

8. An ice cream freezer comprising a container for a freezing agent, a cream container therein, a cover plate having a depression therein adapted to receive additional freezing agent, said cover plate having an inner flange extending downwardly past the inner rim of the cream container, and drainage means comprising a conduit extending through said inner flange and arranged to discharge excess liquid from said depression into said freezing agent container.

EDWIN T. BRACE.